(12) United States Patent
Ericson

(10) Patent No.: US 9,231,711 B2
(45) Date of Patent: Jan. 5, 2016

(54) INTERFERENCE MANAGEMENT SERVICE FOR PORTABLE COMMUNICATION DEVICES

(71) Applicant: HARRIS CORPORATION, Melbourne, FL (US)

(72) Inventor: Daniel W. Ericson, Hollis, NH (US)

(73) Assignee: Harris Corporation, Melbourne, FL (US)

( * ) Notice: Subject to any disclaimer, the term of this patent is extended or adjusted under 35 U.S.C. 154(b) by 167 days.

(21) Appl. No.: 14/087,358

(22) Filed: Nov. 22, 2013

(65) Prior Publication Data

US 2015/0148088 A1 May 28, 2015

(51) Int. Cl.
*H04B 15/00* (2006.01)
*H04W 72/08* (2009.01)
*H04W 16/14* (2009.01)
*H04W 72/10* (2009.01)

(52) U.S. Cl.
CPC ............. *H04B 15/00* (2013.01); *H04W 72/082* (2013.01); *H04W 16/14* (2013.01); *H04W 72/10* (2013.01)

(58) Field of Classification Search
CPC . H04W 72/082; H04W 52/243; H04W 72/10; H04W 28/048
See application file for complete search history.

(56) References Cited

U.S. PATENT DOCUMENTS

| 8,289,939 | B2 | 10/2012 | Jose et al. | |
|---|---|---|---|---|
| 8,417,187 | B2 | 4/2013 | Chen et al. | |
| 2011/0237287 | A1* | 9/2011 | Klein | H04M 3/42178 455/521 |
| 2013/0122811 | A1 | 5/2013 | Scribano et al. | |
| 2013/0148566 | A1* | 6/2013 | Doppler | H04W 72/005 370/312 |
| 2013/0183904 | A1* | 7/2013 | Hiben | H04W 72/082 455/63.1 |
| 2014/0148122 | A1* | 5/2014 | Meredith | H04W 28/0226 455/405 |
| 2014/0243041 | A1* | 8/2014 | Zhao | H04W 88/06 455/552.1 |

FOREIGN PATENT DOCUMENTS

WO WO 2012172476 A1 * 12/2012

OTHER PUBLICATIONS

International Search Report and Written Opinion mailed Nov. 10, 2014, in Application PCT/US2014/048172.

* cited by examiner

*Primary Examiner* — Edward Urban
*Assistant Examiner* — Mohammed Rachedine
(74) *Attorney, Agent, or Firm* — Robert J. Sacco; Carol E. Thorstad-Forsyth; Fox Rothschild LLP

(57) ABSTRACT

Method for mitigating interference is established by means of a local wireless communication (204, 206) between a first portable communication device (PCD) (102, 301) and a second PCD (104, 302). The first and second PCD (301, 302) respectively communicate with first wireless network (110, 306, 310) and second wireless network (112, 308, 312) having different wireless air interface protocols. The local wireless communication link (107) is used to share (208) information (109, 111) concerning one or both of the first and second PCD. The information is then used to determine a communication priority (210) as between the first and second PCD with respect to at least one communication mode. The information is also used to selectively establish (212) an interference mitigation policy (304) to provide assured communications for the PCD with priority. The interference mitigation policy is executed (214) in the first and second PCD to cooperatively provide assured communication for the PCD with priority.

15 Claims, 8 Drawing Sheets

INTERFERENCE MANAGEMENT SERVICE FOR PORTABLE COMMUNICATION DEVICES

BACKGROUND OF THE INVENTION

1. Statement of the Technical Field

The inventive arrangements relate to RF interference management, and more particularly to RF interference management for commercial cell phone devices.

2. Description of the Related Art

One or more radio transceiver devices can be integrated into a personal communication device such as a cellular telephone. For example, Bluetooth, WiFi, cellular and GPS radios can all be included within a single personal communication device. The various radios integrated into a single personal communication device can be managed to permit their apparent simultaneous operation without harmful interference. The operation is said to be apparently simultaneous insofar as the various radios may appear from a user perspective to be operating simultaneously.

The need for radio management operations frequently arises due to the relationship of the frequencies on which one or more radio devices within a single device are communicating. For example, Bluetooth and WiFi are deployed in the same spectrum at 2.4 GHz. Some cellular bands are adjacent to Bluetooth, WiFi, and GPS frequency spectrum. Moreover, algebraic frequency relationships are known to exist between allocations of one radio and another radio. Even small non-linearities cause transmitters at one frequency to generate spurious energy at another frequency. Typically the spurious emissions will appear at frequencies defined by: $ax+/-$ by where a and b are small integers and x and y are radio operational frequencies. Other interference scenarios can arise where radio transmissions from one radio of the personal communication device generate noise energy that extends beyond the intended bandwidth of the signal. This noise energy can interfere with communications operations of other radios included on the device.

In general, cellular radios can be characterized by certain attributes that drive interference management techniques: For example, providers promise users only commercial quality service and it is therefore accepted that reduced radio performance may occur during times of simultaneous operation. Also, apparent (rather than actual) simultaneous radio operation is acceptable. Perhaps most importantly, interference management can be adequately provided internally of the device itself since it has advance knowledge of which radios are present and can include control and processing resources that facilitate management of the various radios which are present.

In contrast to conventional commercial cellular communications, the LMR communication equipment used by first responders (e.g., policemen and firemen) must deliver mission critical quality of service. For these users, reduced radio performance due to interference is not acceptable. Also, from the standpoint of the first responder, a loss in simultaneous operation may be acceptable if necessary to maintain the reliability of mission critical communications.

Cellular telephones are often used in close proximity to LMR radios used by first responders. In some scenarios one or more radio transceivers included on the cellular telephone may operate in the same frequency range or a frequency range adjacent to one that is used by the LMR equipment. Without a mechanism to effect mitigation of interference, critical or high priority messages directed to either the cellular transceiver or first responder radio device can be masked by lower priority messages to the other device. Ultimately, the lack of communication management can prevent important messages from achieving required performance and reliability standards. Device users cannot be expected to anticipate when interference is likely to occur, and cannot be expected to control the severity of such interference effectively In fact, the potential for interference is increasing due to a focus on efficient use of spectrum. The problem is often compounded because users are not aware when a message has been masked due to interference.

SUMMARY OF THE INVENTION

The invention concerns a method for mitigating interference. The method begins by initiating an interference mitigation session. The interference mitigation session is established by means of a local wireless communication between a first portable communication device (PCD) and a second PCD. The first PCD communicates with a first wireless network in accordance with a first wireless air interface, and the second PCD communicates with a second wireless network in accordance with a second wireless air interface. The first and second wireless air interfaces are different insofar as each comprises its own unique air interface protocol. The local wireless communication link is used to share information concerning one or both of the first and second PCD with the other PCD. The information is then used to determine a communication priority as between the first and second PCD with respect to at least one communication mode. The information is also used to selectively establish an interference mitigation policy chosen to provide assured communications for the PCD with priority. Thereafter, the interference mitigation policy is executed in the first and second PCD to cooperatively provide assured communication for the PCD with priority. The communications in the second PCD are maintained, but can be modified to accommodate the assured communications required for the first PCD.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 1:
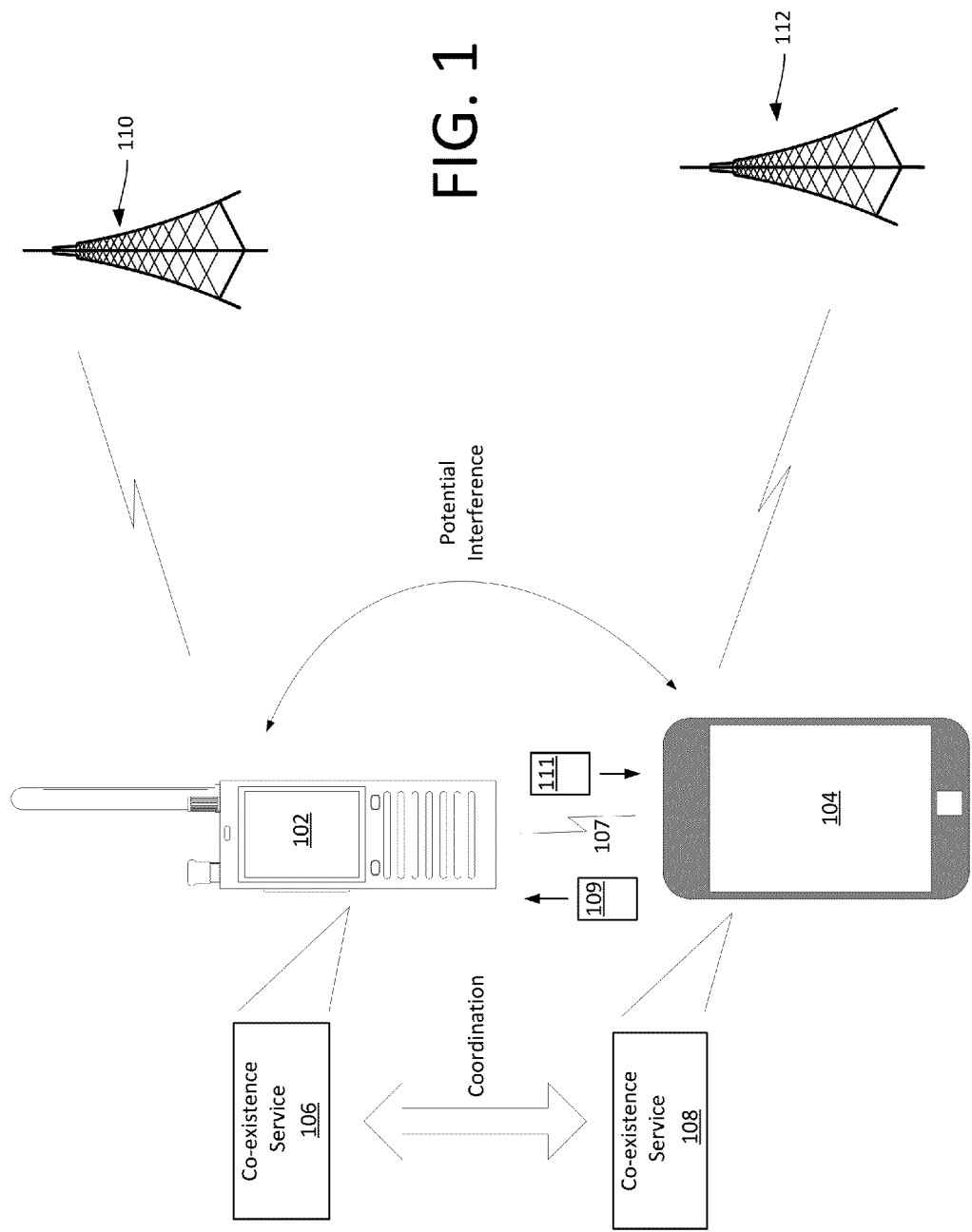
FIG. 1 is a conceptual diagram that is useful for understanding how portable communication devices in separate networks can mitigate interference.

Referring now to FIG. 1 there are shown two personal communication devices (PCDs). In particular, there is shown an LMR radio 102 and a cellular telephony terminal 104. The LMR radio 102 is capable of communicating in accordance with one or more LMR communication protocols. For example, the LMR radio can be configured to communicate with a base station of a wireless LMR communication network 110. Communications with LMR network 110 are conducted accordance with the well-known P25 Phase I/Phase 2 communication standard, the European Terrestrial Trunked Radio (TETRA) protocol, or any other LMR communication protocol now known or known in the future. The LMR radio 102 will include computer processing facilities and memory for executing one or more sets of instructions for implementing various LMR functions.

The cellular telephony terminal 104 comprises a portable communication transceiver system which is capable of performing telephony functions in accordance with one or more cellular communication protocols. For example, the cellular telephony terminal 104 can be configured to communicate with a wireless cellular network 112 in accordance with a wireless telephony communication standard such as the well-known Global System for Mobile Communication (GSM) standard. The cellular telephony terminal 104 can also provide data communications using any of several well-known wireless data communication protocols. For example, such data communications can be provided using a General Packet Radio Service (GPRS), EDGE (Enhanced Data Rates for GSM Evolution) and/or the more recent LTE (long term evolution) standard for high speed data communications. The cellular telephony terminal includes computer processing facilities and memory for executing one or more sets of instructions for executing wireless telephony functions as well as other useful processing functions.

Each of the LMR radio 102 and the cellular telephony terminal 104 can include other communication capabilities. For example, each device can include hardware and software facilities sufficient for each device to participate in a wireless local area network (WLAN). For example, such communication capabilities can be based on a well-known standard such as the Institute of Electronics and Electrical Engineers' (IEEE) 802.11 standards which operate in the 2.3 GHz band. The LMR radio 102 and the cellular telephony terminal can also be configured to participate in a personal area network (PAN) such as the Bluetooth wireless technology standard which operates in the 2400-2480 MHz band.

A cellular telephony terminal 104 which is operated in close proximity to an LMR radio 102 can cause harmful interference. This situation frequently arises in scenarios where a cellular telephony terminal is operated in one or more frequency bands that are adjacent to frequency bands that are used by an LMR radio device. For example, public safety communications allocated to "Band 14" are adjacent to certain LTE cellular allocations in Band 13. Accordingly, in the absence of some mitigation means, interference can occur as between an LMR radio 102 and cellular telephony terminal 104. Such interference can cause critical or high priority messages from an LMR radio to be masked by lower priority messages from the cellular telephony terminal. Ultimately, this lack of communications management may prevent important messages from achieving required performance and reliability standards.

The ubiquity of personal cell phones creates the likelihood that an LMR radio 102 will be used in close proximity to a cellular telephony terminal 104. Accordingly, a mechanism for discovery and coordination of these proximate assets is required to achieve reliable communication. However, a device user cannot anticipate when device interference is likely to occur, and cannot be expected to control its severity with any degree of effectiveness. To address these issues, a coexistence service is advantageously installed in each of an LMR radio 102 and a cellular telephony terminal 104. Such coexistence services are shown in FIG. 1 as coexistence service 106 and coexistence service 108. The coexistence service in each device can be implemented as software, firmware or hardware which is configured to carry out the interference mitigation functions as described herein.

Commercial quality cellular communication services have a typical reliability of about 95%. That is to say that 95% of the time a cell phone can perform a service by using a given frequency allocation. If this band does not work (perhaps because of interference) it implements various handoff and roaming algorithms in an attempt to find other frequencies where the service requirements may be satisfied.

By contrast LMR radios used by first responders depend upon frequency allocations that can support very high reliability. LMR systems used by public service workers such as first responders typically work in one of three different ways: direct, conventional, and trunking. Direct communications allow devices to communicate directly without any infrastructure. Conventional system devices transmit to a base station that re-broadcasts to other devices and sometimes to a system that is connected to other base stations. Trunking systems have a control channel that is monitored by idle devices. The control channel tells radios to tune to another channel (working channel) to take part in a particular voice group. Once a conversation is complete radios return to the control channel to monitor for new activity. Each of these operating modes depends on the assignment of RF channels that can provide high availability/reliability.

The dependence of LMR radios on a fixed frequency assignment means that LMR devices cannot avoid interference by roaming to a different band. Therefore, different methods must be used to coordinate and prioritize communications through this service.

In order to address these unique problems associated with LMR radios, the coexistence service 108 can include a service operating on a commercial cell phone that is a part of a distributed (multiple device) interference management system for high reliability LMR radio communications. The coexistence service 108 and coexistence service 106 form a distributed interference management system that effectively maintains mission critical reliability on high priority services. The coexistence service can perform several functions which include (1) discovery and communication with proximate devices, (2) management of devices with fixed frequency allocations, (3) management of devices with fixed high power levels.

The distributed coexistence service can also perform activities which facilitate mitigation mechanisms for minimizing adverse effects of interference. These mitigation mechanisms can include (1) consolidation of services among multiple communication devices, (2) replication of signaling, (3) LTE throttling, (4) duty cycle evaluation, power control, and resource group control, (5) enforced roaming, and (6) temporary preemption.

According to one aspect, the method for mitigating interference can begin by initiating an interference mitigation session involving two portable communication devices (PCDs). For example, a first PCD can be an LMR radio 102 and a second PCD can be a cellular telephony device 104, such as a smart phone. LMR radios and smart phones are well known in the art and therefore will not be described here in detail. However, it will be appreciated that an LMR radio 102 generally communicates on different frequencies as compared to a cellular telephony devices 104. Also, the cellular telephone device will generally communicate using a different air interface protocol or communication standard as compared to the LMR device. Accordingly, the devices are generally designed to communicate on two distinct and separate networks. For purposes of this disclosure, the first PCD can be understood to communicate with a first wireless network in accordance with a first wireless air interface, and the second PCD can communicate with a second wireless network in accordance with a second wireless air interface different from the first wireless air interface. An interference mitigation software service executes on a computer processor in each device for carrying out the methods described herein.

The interference mitigation session can begin with a discovery process by which the two PCD devices 102, 104 are able to discover each other's presence and establish a local wireless communication link 107 between them. This discovery process can be practiced using any of several well-known methods for discovery of nearby devices in short range wireless networks. For example, short range networks such as Bluetooth devices have an ability to engage in this discovery process. However, any other suitable short range wireless communication technology can be used for this purpose. For example, Bluetooth, ZigBee, Near Field Communication (NFC) and other types of personal area networks can be suitable. These short range communications methods are well known and therefore will not be described here in detail.

Once established, the local wireless communication link 107 is used to share interference management information concerning at least one of the first and second PCDs. Interference management information to be shared as between the two devices can include a wide variety of functional communication parameters that are useful for understanding the potential for mutual RF interference caused by one PCD to the other. Accordingly, this information can include receive frequencies, transmit frequencies, transmit power levels, receiver selectivity, modulation methods, wireless communication protocols that are in use, antenna gain and so on. The information can also include priority information as discussed below. A data file 109, 111 containing this information can be communicated from at least one PCD to the other PCD. For example, the cellular telephony unit can communicate this data about itself to the LMR radio using the local wireless link 107. The data can be communicated in a particular pre-defined file format which is recognized by the first and second devices. The LMR radio can also communicate to the cellular telephony device similar functional communications parameters pertaining to the LMR radio. Accordingly, each device can be aware of the functional communication parameters pertaining to the other radio.

In some embodiments the system can be configured so that only one device communicates its functional communication parameters to the other device. Also, the functional communication parameter information can be shared from one device to the other by simply identifying a particular make, model and/or type of device. In such a scenario, each of the first and second PCD can access a database stored onboard the device or elsewhere to discover all relevant communication parameter information based on the specified device manufacturer, model, and/or type of device.

Once the first and second PCDs have shared information as described herein, the information is used by at least one of the devices to determine a communication priority as between the first and second PCD with respect to at least one communication model. For purposes of the present invention, a communication priority shall be a comparative measure by which it is determined which of the first and second PCD has a higher priority with respect to matters of assured communications. For example, consider the scenario where a first PCD is a public service LMR radio assigned to an emergency responder, and the cellular telephony device is a personal cellular phone that is used by the emergency responder for personal communications. In such a scenario, the public service LMR radio can be assigned a higher priority with respect to assured communications since assured communications are particularly important for emergency responders. The priority determination can be made using any suitable methods. For example, each device can be assigned a relative priority value by a system administrator. For example, a numerical value can be used for this purpose. In such a scenario, the priority values of the two units could be compared to determine which unit has higher priority. Alternatively, other functional aspects of the two devices can be compared in accordance with an algorithm to determine which device should have higher priority. The algorithm could consider one or more aspects of the shared information to determine priority.

Notably, priority can be assigned at the device level (e.g. the first PCD always has priority as compared to the second PCD) or at the communication mode level. When priority is assigned at the communication mode level, priority levels can be assigned with respect to each mode of communication offered by each device. For example, push-to-talk (PTT) voice communications involving the first PCD can have priority over broadband data communicated using the second PCD. But PTT voice communications of the first PCD can be set to have a lower priority as compared to text message data communicated from the second PCD.

Based on the shared information (including the communication priority information), one or both devices will selectively establish an interference mitigation policy. For example, one of the PCD's can determine the interference mitigation policy and inform the other PCD of the policy which has been selected. In some scenarios, the PCD with greater priority rank can be selected as the device which selects or defines the interference mitigation policy which is to be used. The mitigation policy is comprised of one or more rules or policies which are chosen to provide assured communications for the PCD with priority. Rules or policies for mitigating interference in various settings and/or for different combinations of devices are determined in advance. Particular rules or policies are then chosen or selected for mitigation interference based on the shared information.

Once the interference mitigation policy has been established in each of the first and second PCD, the policy is initiated and then executed by each device. According to one aspect of the invention, the local communication link is used to periodically verify that the first and second PCD are still in proximity to each other. A proximity check communication can be periodically sent from one PCD to the other PCD for this purpose. If the units can no longer successfully communicate using the local communication link, it can be assumed that the devices are not in proximity to one another and the interference mitigation policy can be suspended. For purposes of the present invention, proximity can be understood to mean a sufficiently close distance so that, in the absence of interference mitigation, interference is likely to occur. As an example, this can occur when two devices are spaced apart by a distance of less than about 10 meters. Still, the invention is not limited in this regard and proximity for the purposes of the present invention can also be understood to mean a distance of about 100 meters or less. Since proximity is evaluated in part based on the ability of the first and second PCD to communicate over the local wireless link, a proximate distance can in some instance depend in part on the communication distance of a particular short distance wireless communication protocol that is selected for implementing the local wireless link. As an example, low powered Bluetooth devices can have a range of about 10 meters, whereas high powered Bluetooth devices can have a range of about 100 meters.

The interference mitigation policy in the first and second PCD is selected so that the first and second PCD will cooperatively provide assured communication for the PCD with priority. Cooperatively providing assured communication can be as simple as selectively implementing the interference mitigation policy during periods of time when the first and second PCD determine that they are in proximity to each other. However, the cooperative provision of assured communication can also involve coordination and assistance with respect to certain communication operations.

Figure 2:
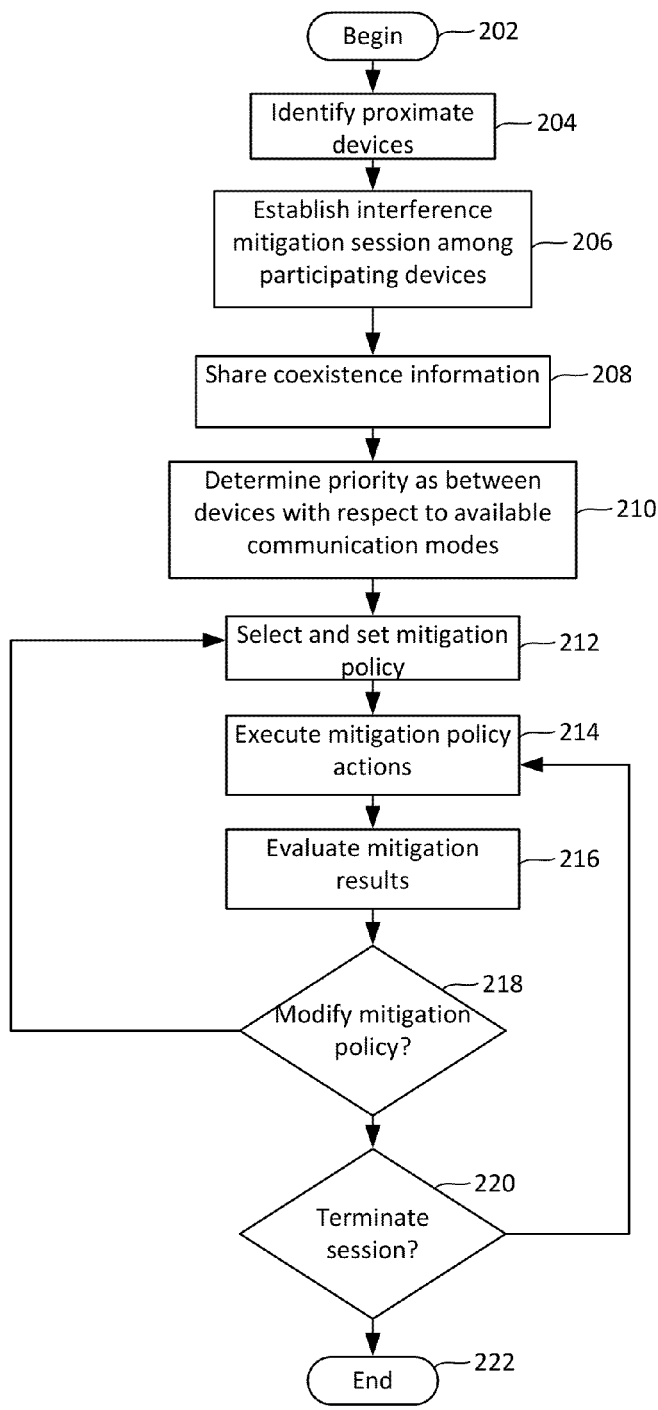
FIG. 2 is a flowchart that is useful for understanding a method for mitigating interference.

The foregoing processes will now be described in further detail in relation to the flow chart in FIG. 2. The process begins at 202 and continues to 204 where a first PCD identifies a proximate second PCD. At 206 the first and second PCD establish an interference mitigation session, for example by means of a communication handshake and/or verification. The verification process can include an authentication process to prevent unauthorized PCDs from participating in the interference management session. At 208 the first and/or second PCD share information concerning functional communication parameters. At 210, a priority determination is made so as to establish communication priority with respect to the first or second PCD and/or their available communication modes. Thereafter, based on the shared information and the communication priority evaluation, an interference mitigation policy is selected and then set in each device at 212. Once the mitigation policy has been set, the policy is executed at 214.

RF interference caused to one PCD by another PCD can be affected by a wide variety of factors, and some of these factors can change over time. Accordingly, it is advantageous to periodically evaluate at 218 whether the mitigation policy which has been adopted in each PCD is providing satisfactory results. The degree of satisfaction resulting from the mitigation policy can be evaluated in any manner deemed suitable. As an example, the evaluation can include a determination of the bit error rate for signals received by the PCD having priority with respect to a particular communication mode. If the bit error rate is below a predetermined threshold, this can serve as an indication that the mitigation policy is not adequate for preventing interference. Still, the invention is not limited in this regard and any other suitable evaluation method can be used.

If the mitigation policy is not found to be satisfactory (218: No), then the process returns to step 212 where a new mitigation policy is selected and set as described herein. Otherwise, the process continues on to step 220 where a determination is made as to whether the interference mitigation session is to be terminated. Termination at this step can be initiated based on a determination that the PCDs participating in the interference mitigation session can no longer effectively communicate over the local wireless link. Alternatively, termination can initiated by a user or system administrator.

According to one aspect of the invention, the interference mitigation described herein can include mitigating interference caused to the first PCD by a wireless communication link established between the second PCD and a base station of the second wireless network to which the second PCD is designed to communicate. In such a scenario, interference mitigation can include using the second network wireless communication link to communicate data which was directed to the first PCD from the first wireless network. In other words, communication to the first PCD can be consolidated or replicated on a wireless communication link provided by the second wireless network.

Figure 3:
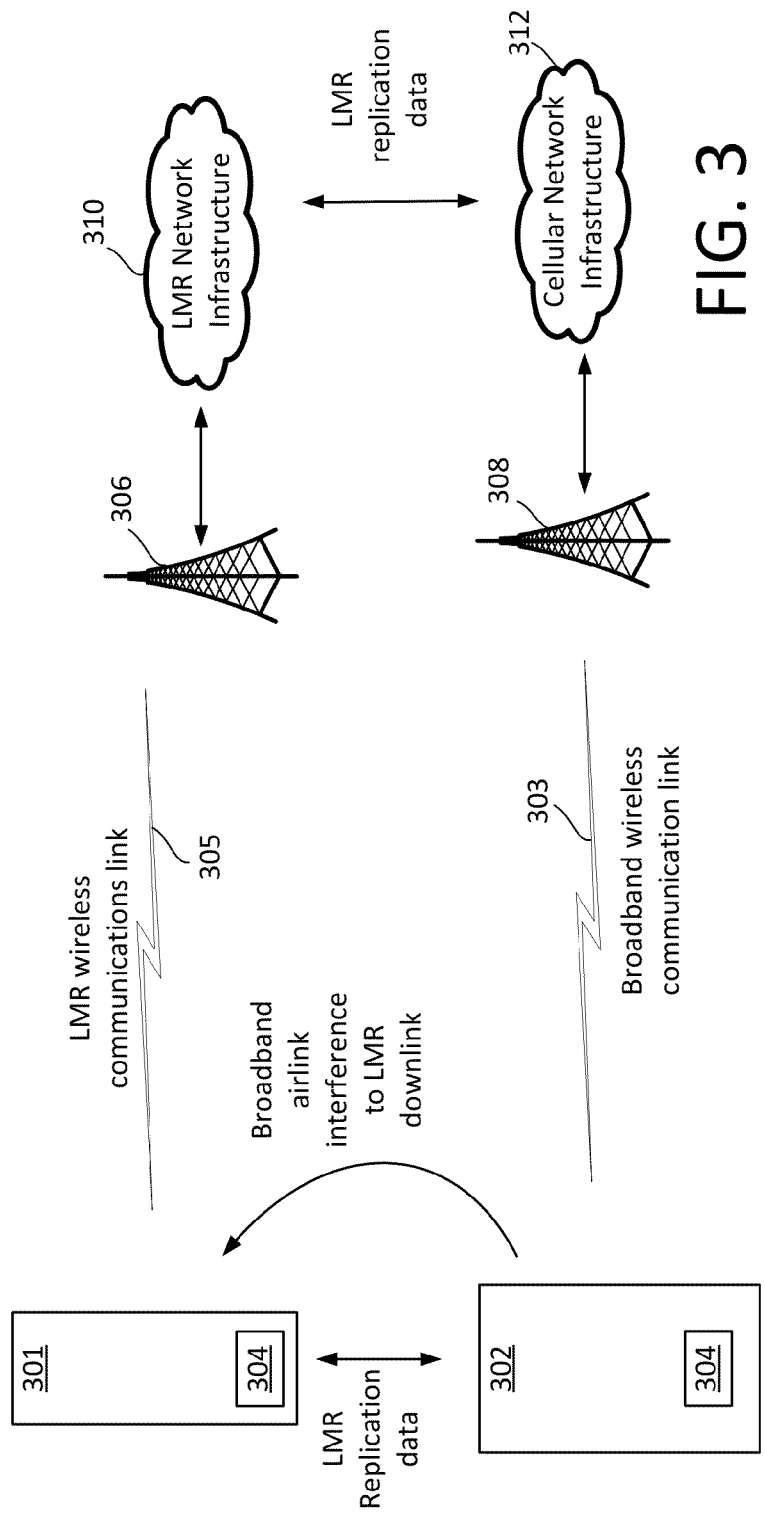
FIG. 3 is a conceptual diagram which is useful for understanding an interference mitigation process in which data for a first network is communicated through a second network.

For example, consider the exemplary arrangement of FIG. 3 in which a first PCD 301 is an LMR radio and the second PCD 302 is a cellular telephony device or smartphone. The first and second PCD are operating in accordance with an interference mitigation policy 304. A first wireless network can include one or more elements such as the first PCD 301, the base station 306 and LMR network infrastructure 310. A second wireless network can similarly include one or more components such as the second PCD 302, the base station 308, and cellular network infrastructure 312.

In the scenario shown in FIG. 3, the first PCD 301 is assumed to have priority but will receive interference from the second PCD 302 when the second PCD is transmitting. A transmit frequency of broadband wireless communication link 303 is adjacent to a receive frequency utilized by the first PCD when communicating using an LMR wireless communication link 305. An example of such a scenario could involve public safety communications allocated to "Band 14" which are adjacent to certain broadband LTE cellular allocations in Band 13. Accordingly, transmitted signals from the second PCD can interfere with reception of signals by the first PCD. In such a scenario, the broadband wireless communication link 303 can be used to communicate first data from the first wireless network that has been directed to the first PCD. In this example the first data is replicated data (voice data and/or signaling data) which is normally communicated directly to the first PCD 301 by the base station 306. The first data in such a scenario is provided to a base station 308 of the second wireless network where it is communicated to the second PCD 302 over the broadband wireless communication link 303. The first data can be provided to base station 308 by means of LMR network infrastructure 310 and cellular network infrastructure 312 as shown.

According to one aspect of the invention, the broadband wireless communication link 303 can also be used to communicate second data from the second PCD to the base station 308 concurrent with the first data. The second data in such a scenario can be data which exclusively pertains to the second wireless network. For example, the second data can be broadband video data that is communicated from the second PCD 302 to base station 308.

After receiving the first data at the second PCD 302, the first data can be communicated from the second PCD to the first PCD 301. For example, such data can be communicated directly from the second PCD to the first PCD using the local communication link (not shown in FIG. 3) between the first and second PCDs. Accordingly, the first PCD in such a scenario is assured of receiving the first data even though it is experiencing interference due to the broadband communication link 303 as implemented by the second PCD.

Notably, the first data can also be concurrently communicated to the first PCD 301 directly from base station 306 by using LMR wireless link 305. In such a scenario, the first PCD can potentially receive the first data from the first wireless network infrastructure, and can also receive such data from the second wireless network infrastructure. The first PCD can then optionally compare packets received from each source and discard any data packets which are duplicative or corrupted. Still, the invention is not limited in this regard and in some scenarios the first data can be received at the first PCD 301 exclusively by way of the second PCD 302, base station 308 and cellular network infrastructure 312. In such a scenario, all downlink communications from LMR network infrastructure 310 to the first PCD 301 are communicated through cellular network infrastructure 312, base station 308, broadband wireless communication link 302, second PCD 302 and the local wireless link (not shown in FIG. 3). Uplink communication from the first PCD to the bases station 306 can also be communicated using the broadband wireless link 303. Alternatively, such uplink data from PCD 301 can continue being communicated directly to base station 306 using LMR wireless communication link 305.

For purposes of interference mitigation, it is not necessarily required for the first data (e.g. LMR replication data) to be forwarded from the second PCD to the first PCD as described herein. According to one aspect of the invention, the first data received in the second PCD 302 can be used directly and exclusively within the second PCD for interference mitigation purposes. For example, the first data communicated to the second PCD can comprise signaling data for controlling a communication session involving the first PCD 301 and the first wireless network base station 306. Such signaling data can include signaling used to set up a communication link between the base station 306 and the first PCD 301. As such, the signaling data will include one or more control signals which are indicative that a message from the first base station 306 will be communicated to the first PCD 301. The second PCD 302 can use this information to mitigate interference to the first PCD. For example, the second PCD 302 can be alerted to the fact that a voice data is being (or will be) transmitted to the first PCD from base station 306. In response to such signaling, the second PCD 302 can temporarily suspend any transmissions which are likely to cause interference to the first PCD 301 during times when the first PCD is trying to receive data from the first wireless network. The foregoing arrangement is illustrated in FIG. 4 which shows that interference to LMR wireless communication link 305 is prevented by controlling transmissions from second PCD 302.

Figure 4:
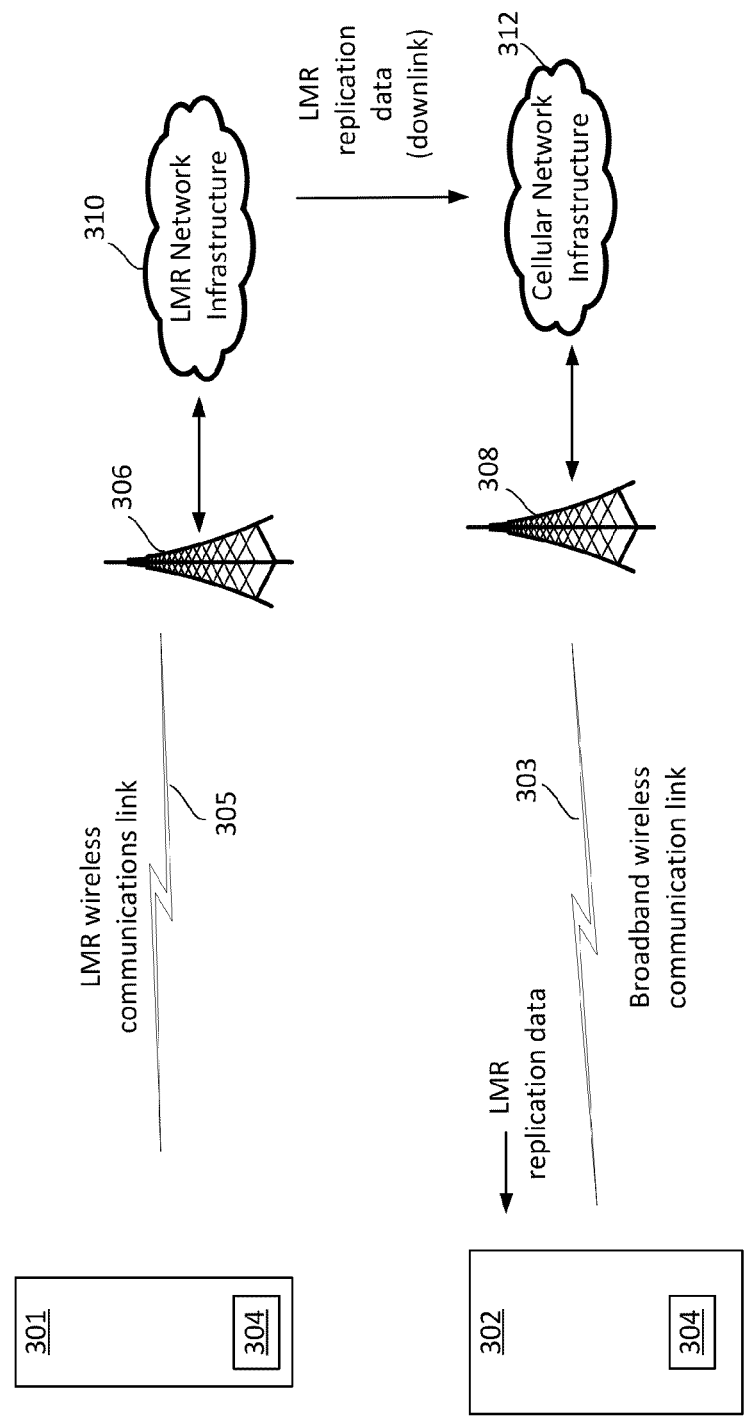
FIG. 4 is a conceptual diagram that is useful for understanding an alternative embodiment of the interference mitigation process illustrated in FIG. 3

For example, consider a scenario in FIG. 4 where the second PCD 302 is transmitting video images to a base station 308 of the second wireless network using a broadband wireless communication link 303. During such transmission, it receives a control signal message comprising LMR replication data sent by way of cellular network infrastructure 312, base station 308, and broadband wireless communication link 303. The control signal indicates that the first wireless network is transmitting (or intends to transmit) voice data to the first PCD using the LMR wireless communication link 305.

Based on the shared information, it is known that the broadband wireless communication link 303 will interfere with the ability of the first PCD to receive voice data from base station 306. Accordingly, the second PCD 302 can temporarily suspend its video data transmissions over the broadband wireless data link 303. Specifically, it can suspend transmissions when it is notified that a communication is in progress or is being initiated between the first PCD 301 and base station 306. Accordingly, the second PCD can avoid interference to the first PCD while the first PCD is receiving the voice data using the first wireless network. The broadband transmission of video data from the second PCD could resume when the signaling data received at the second PCD indicates the termination of the communication involving the first PCD. In the foregoing scenario, only signaling data would need to be provided to the second PCD for purposes of implementing the interference mitigation methods described herein. However, the invention is not limited in this regard.

From the foregoing it will be appreciated that the second PCD can perform at least one action to mitigate interference to the first PCD. However, the second PCD is not limited to the interference mitigation strategies indicated above. As an alternative or in addition to the mitigation methods described above, other mitigation techniques could also be employed. For example, a transmitter power level for the second PCD 302 could be reduced at certain times. According to one aspect of the invention, the transmitter power level used by PCD 302 to transmit the wireless broadband data signal can be reduced during periods when the first PCD 301 is attempting to receive signals. Alternatively, the second PCD 302 could throttle a transmission data rate during such periods. Reducing the data rate can be an effective way to reduce interference to adjacent frequency channels. As a further alternative, the second PCD could control a transmit time duration or an interval between transmit times when transmitting data from the second PCD to the second wireless network base station. This reduction in duty cycle will reduce interference to the first PCD when it is attempting to receive signals from the first wireless network.

Other options are also available for the second PCD. For example the second PCD can initiate a change in the frequency it uses to communicate with the second wireless network. This can be accomplished by causing the second PCD to enter into a roaming mode whereby the second PCD communicates with a different base station associated with the second wireless network. The second base station in this scenario would have a different uplink receive frequency so that the second PCD 302 could reduce any interference caused to the first PCD by transmitting at a different frequency. One or more of these interference mitigation steps can be implemented whenever the second PCD 302 determines that first PCD 301 is attempting to receive data from base station 306.

Figure 5:
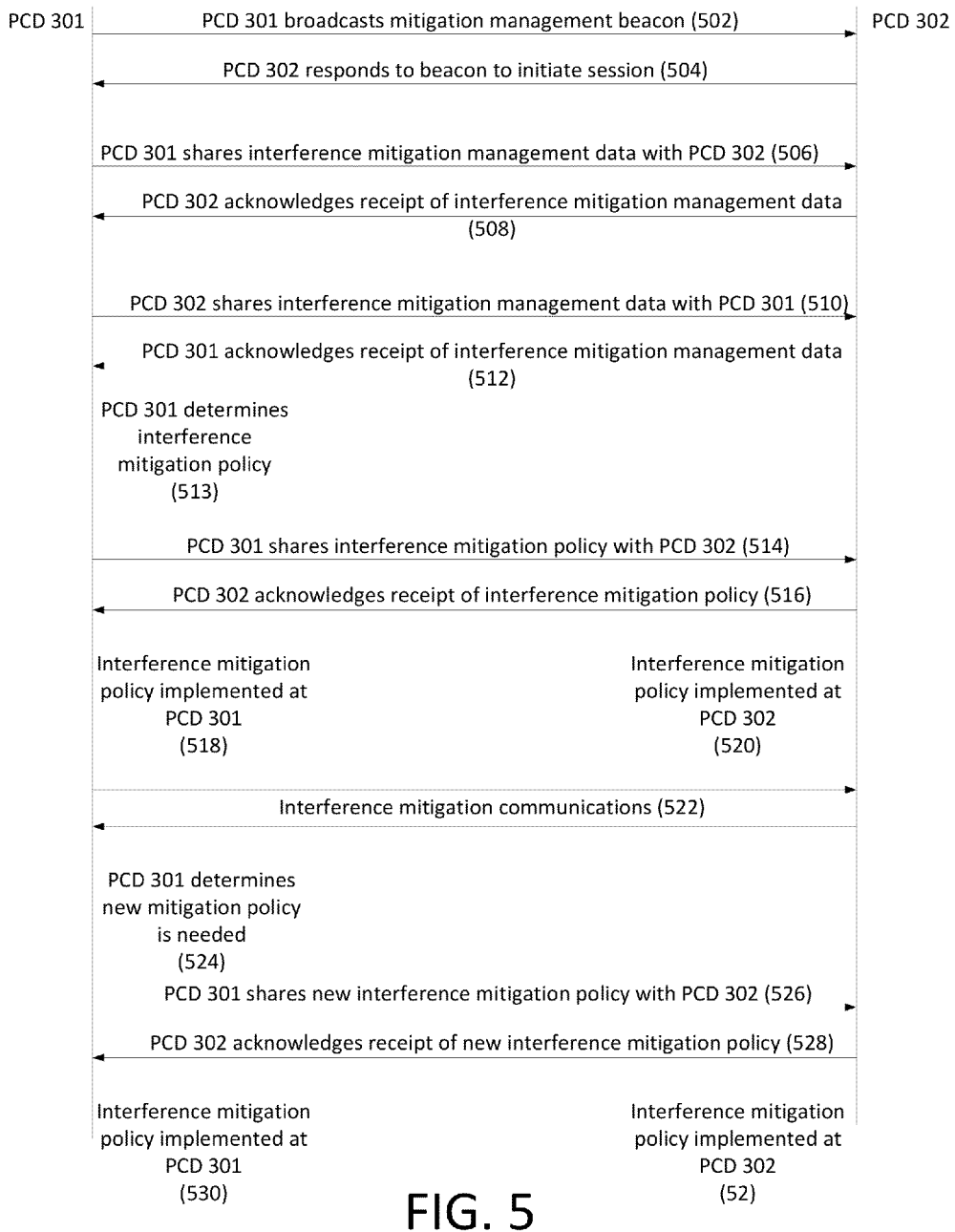
FIG. 5 is a drawing that is useful for understanding a communication process involving a first and second portable communication device for implementing an interference mitigation method.

Referring now to FIG. 5 there is shown a diagram that is useful for understanding an interaction involving the first and second PCD. The process begins by each of first PCD 301 and second PCD 302 discovering the presence of the other. This can be accomplished using well known device discovery techniques as are common in ad hoc networks. As an example, first PCD 301 can broadcast a mitigation management beacon signal at 502 using a short range wireless communication. The beacon signal can be detected by second PCD 302 which transmits a response signal at 504. The transmission of the beacon and response constitute a handshake process which initiates the interference management session.

After initiating the session, first PCD 301 can share at 506 interference mitigation management data with second PCD 302. This shared data can include functional communication parameters associated with first PCD 301 and communication priority information for first PCD 301. Thereafter, second PCD 302 acknowledges receipt of the interference mitigation management data at 508. Second PCD 302 can then transmit interference mitigation management data with first PCD 301 at 510. In response, first PCD 301 acknowledges receipt of the interference management data at 512.

For purposes of this example, it is assumed that first PCD 301 has communication priority over second PCD 302. Accordingly, first PCD 301 at 513 determines an appropriate interference mitigation policy based. The policy is based on the shared information, including the priority information. Once the interference mitigation policy has been determined, first PCD 301 shares the interference mitigation policy with second PCD 302 at 514. The second PCD 302 acknowledges receipt of the interference mitigation policy at 516. At 518 and 520, the interference mitigation policy is implemented in Devices A and B. Depending on the particular interference mitigation policy that has been selected, one or more communications are transmitted at 522 between first PCD 301 and second PCD 302 for implementing the policy as described above.

At least one of first PCD 301 and second PCD 302 can periodically evaluate whether the interference mitigation policy is providing satisfactory results. In the example shown, first PCD 301 determines at 524 that a new interference mitigation policy is needed. Accordingly, first PCD 301 shares a new interference mitigation policy with second PCD 302 at 526. Second PCD 302 acknowledges receipt of the new interference mitigation policy at 528. At 530, 532 the new interference mitigation policy is implemented (executed) at first PCD 301 and second PCD 302. The process continues in this way until the session is terminated by a user or due to the fact that the devices A and B are no longer in sufficient proximity for communications to continue using a local wireless communication link.

Figure 6:
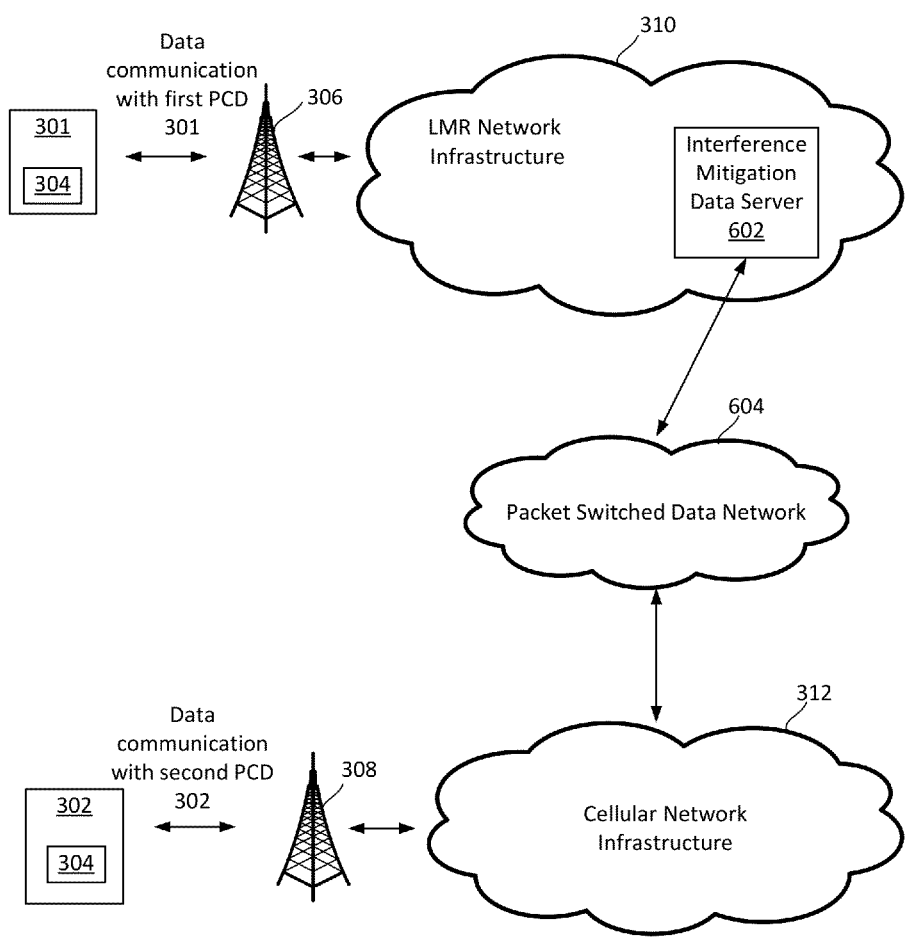
FIG. 6 is a drawing which is useful for understanding an interference mitigation process in which data for a first network is communicated through a second network.

Referring now to FIG. 6, there is shown a drawing which is useful for understanding the way in which data from the first network infrastructure 310 can be provided to second PCD 302. In the scenario shown in FIG. 6, an interference mitigation policy 304 is selected that requires data from the first network infrastructure 310 to be communicated to the second PCD 302. Accordingly, the first PCD 301 will communicate to the network infrastructure 310 that first data which is to be communicated to first PCD 301 is to be made available to an external service. The network infrastructure 310 responds to this instruction by providing the specified data to an interference mitigation data server 602. The data provided can be user data (voice, video, etc.) which is intended for the information of the user, and/or signaling data which used by the base station 306, PCD 301 and LMR network infrastructure for matters such as call setup, call maintenance, and call termination.

The second PCD 302 will communicate to the network infrastructure 312 to request data which is being made available from interference mitigation server 602. The information concerning the address of interference mitigation server 602 can be provided to second PCD 302 as part of the data included with the interference mitigation policy 304. Accordingly, second PCD 302 will forward this address information to the network infrastructure 312 as part of its data request. In response, a server associated with the network infrastructure 312 will establish a network data communication session with interference mitigation data server 602. As an example, this communication session can be facilitated by means of packet switched data network 604. Once the communication session has been established, the first data which is to be communicated to first PCD 301 is also communicated to network infrastructure 312. The network infrastructure passes this data to the second PCD 302 using base station 308 as previously described.

Figure 7:
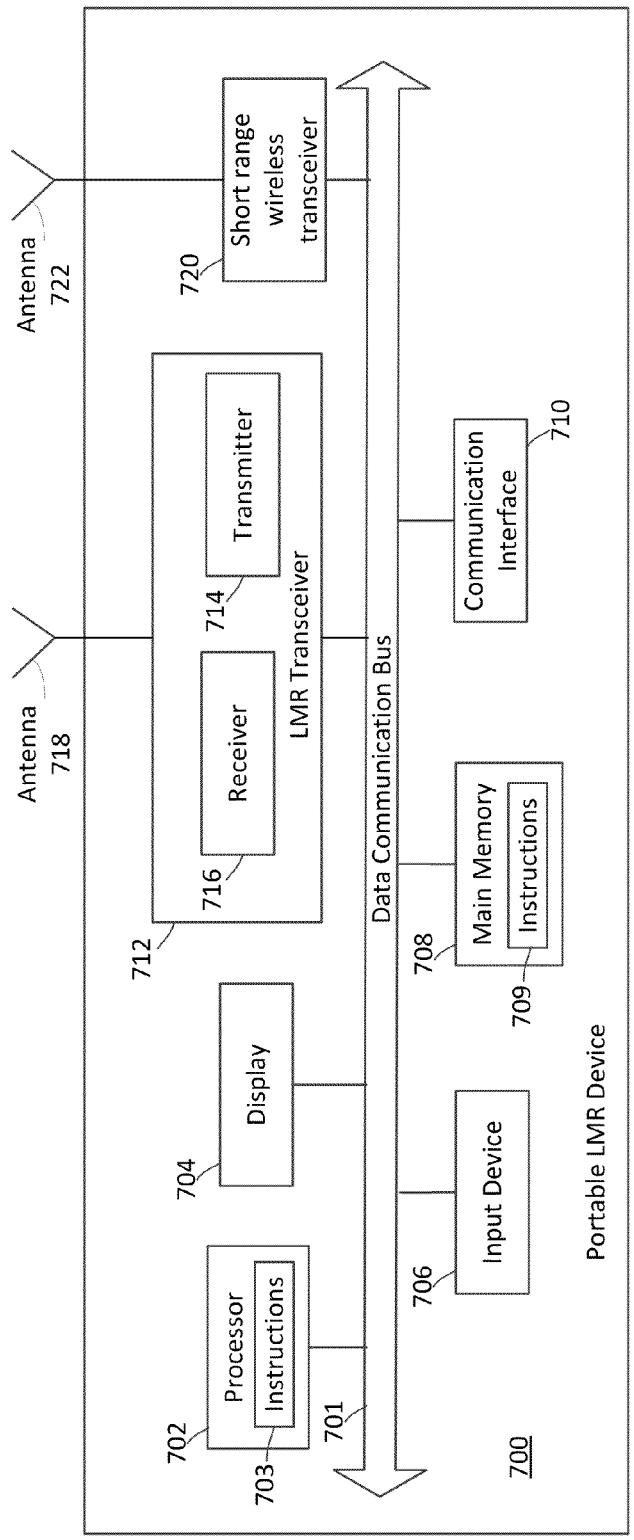
FIG. 7 is a block diagram that is useful for understanding a portable communication device which participates in an LMR network.

Referring now to FIG. 7 there is shown a simplified block diagram of an exemplary PCD in the form of portable LMR device 700. The portable LMR device 700 includes a computer processing unit such as processor 702. The system also includes an LMR transceiver 712 which is comprised of a transmitter 714 and a receiver 716. An antenna 718 is coupled to the transceiver to facilitate RF communication. The receiver 716 is configured to receive RF signals on one or more LMR frequency bands. The transmitter 714 is advantageously configured to transmit RF signals on one or more frequency bands corresponding to a particular LMR communication protocol. A data communication bus 701 can be used to communicate digital data as needed among the various components comprising the portable LMR device.

The LMR device can include a user interface such as display 704 for communicating information to a user. User input devices 706 are provided for purposes of allowing a user to enter control commands and other types of information. The user input devices can include one or more of a keypad, a pointing device and any other suitable types of hardware and/or software for entering user data. Suitable communication interface hardware 710 is provided to facilitate communication input and output to the portable LMR device. For example, the communication interface hardware can include a microphone for detecting user audio (e.g. speech input) and a loudspeaker for reproducing received audio.

A memory 708 is provided for storing programming instructions 709 which are executed by the processor 702, and data needed for operations of the portable LMR device 700. The memory can also be used for storing interference mitigation policies as described herein. Any suitable type of memory can be used for this purpose. For example, the memory 708 can include one or more of a hard disk drive, a CD-ROM (compact disk read-only memory), RAM (random-access memory) or ROM (read-only memory), a flash memory card and so on. Any type of non-transitory storage medium capable of storing program instructions and digital data can be used for this purpose. The programming instructions 709 can include instructions for executing the interference management processes described herein.

The processor 702 is comprised of one or more computer processing elements. For example the computer processing elements can include a digital signal processor (DSP), a general purpose microprocessor, a microcontroller, and/or any other processing device which can be controlled using software or programming instructions. The operating instructions or computer software described herein can be stored in the memory 709, but can also reside in memory 703 included within the processor 702. According to one aspect of the invention, the LMR device 700 can be configured to implement radio communications in accordance with a P25 communication protocol, or any other commercial or public service type communication protocol.

The transmitter 714 and receiver 716 are configured to facilitate RF communication of data, and to communicate information bursts or packets in an LMR wireless network. As such, transmitter 714 and receiver 716 can include conventional communication circuitry to enable digital data transmission over a wireless communication channel. Those skilled in the art will appreciate that the particular architecture shown in FIG. 7 is exemplary and merely represents one possible arrangement of a communication system suitable for implementing the processing methods described herein. The portable LMR device can be implemented as part of an architecture including hardware and/or software in accordance with known techniques. Those skilled in the art will recognize that certain functions of the transmitter 714 and/or receiver 716 may be implemented in a processor or processors, such as the processor 702.

The portable LMR device 700 can also include a short range wireless transceiver 720, and a short range antenna 722. The short range wireless transceiver can be coupled to processor 702 to facilitate any of several well-known short range wireless communication protocols. For example, the transceiver 720 can be configured to participate in a personal area network (PAN) such as the Bluetooth wireless technology standard which operates in the 2400-2480 MHz band. As such, the short range wireless transceiver can be used to implement a local wireless communication link between a first and second PCD as described herein.

Referring now to FIG. 4 there is shown a simplified block diagram of an exemplary PCD in the form of a cellular telephony device or smart phone 800. The smart phone 800 includes a computer processing unit such as processor 802. The system also includes a transceiver 812 which is comprised of a transmitter 814 and a receiver 816. An antenna 818 is coupled to the transceiver to facilitate RF communication. The receiver 816 is configured to receive RF signals on one or more frequency bands associate with a wireless broadband cellular communication system. The transmitter 814 is advantageously configured to transmit RF signals on one or more frequency bands corresponding to a particular broadband cellular communication protocol. A data communication bus 801 can be used to communicate digital data as needed among the various components comprising the smart phone.

The cellular telephony device/smartphone 800 can include a user interface such as display 804 for communicating information to a user. User input devices 806 are provided for purposes of allowing a user to enter control commands and other types of information. The user input devices can include one or more of a keypad, a pointing device and any other suitable types of hardware and/or software for entering user data. Suitable communication interface hardware 810 is provided to facilitate communication input and output to the smart phone. For example, the communication interface hardware can include a microphone for detecting user audio (e.g. speech input) and a loudspeaker for reproducing received audio.

A memory 808 is provided for storing programming instructions 809 which are executed by the processor 802, and data needed for operations of the smart phone 800. Any suitable type of memory can be used for this purpose. For example, the memory 808 can include one or more of a hard disk drive, a CD-ROM (compact disk read-only memory), RAM (random-access memory) or ROM (read-only memory), a flash memory card and so on. Any type of non-transitory storage medium capable of storing program instructions and digital data can be used for this purpose. The programming instructions 809 can include instructions for executing the interference management processes described herein.

The processor 802 is comprised of one or more computer processing elements. For example the computer processing elements can include a digital signal processor (DSP), a general purpose microprocessor, a microcontroller, and/or any other processing device which can be controlled using software or programming instructions. The operating instructions or computer software described herein can be stored in the memory 809, but can also reside in memory 803 included within the processor 802. According to one aspect of the invention, the communication system 800 can be configured to implement radio communications in accordance with a broadband cellular radio communication protocol as is commonly used for wireless telecommunications.

Figure 8:
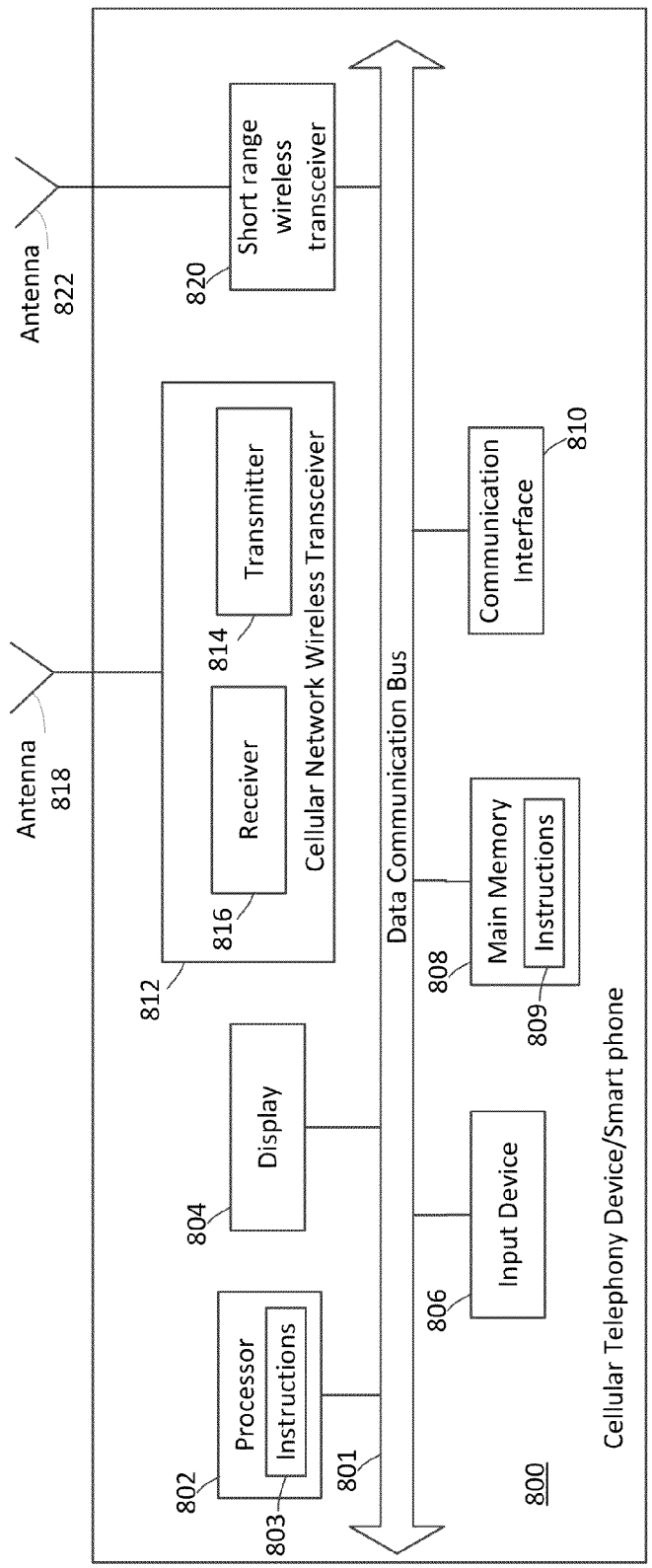
FIG. 8 is a block diagram that is useful for understanding a portable communication device which participates in a wireless cellular network.

The transmitter 814 and receiver 816 are configured to facilitate wireless cellular RF communication of data in bursts or packets. As such, transmitter 814 and receiver 816 can include conventional communication circuitry to enable digital data transmission over a wireless cellular communication channel. Those skilled in the art will appreciate that the particular architecture shown in FIG. 8 is exemplary and merely represents one possible arrangement of a smart phone device suitable for implementing the processing methods described herein. The smart phone can be implemented as part of an architecture including hardware and/or software in accordance with known techniques. Those skilled in the art will recognize that certain functions of the transmitter 814 and/or receiver 816 may be implemented in a processor or processors, such as the processor 802.

The portable LMR device 800 can also include a short range wireless transceiver 820, and a short range antenna 822. The short range wireless transceiver can be coupled to processor 802 to facilitate any of several well-known short range wireless communication protocols. For example, the transceiver 820 can be configured to participate in a personal area network (PAN) such as the Bluetooth wireless technology standard which operates in the 2400-2480 MHz band. As such, the short range wireless transceiver can be used to implement a local wireless communication link between a first and second PCD as described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The methods described herein are stored as software programs in a computer-readable storage medium and are configured for executing on a computer processor. Furthermore, software implementations can include, but are not limited to, distributed processing, component/object distributed processing, parallel processing, virtual machine processing, which can also be constructed to implement the methods described herein. The term "computer-readable medium" shall be taken to include, but not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

I claim:

1. A method for mitigating interference, comprising:
    initiating an interference mitigation session by establishing a local wireless communication link between a first portable communication device (PCD) that communicates with a first wireless network in accordance with a first wireless air interface, and a second PCD that communicates with a second wireless network in accordance with a second wireless air interface different from the first wireless air interface;
    using the local wireless communication link to share information concerning at least one of the first and second PCD;
    using the information to determine a communication priority as between the first and second PCDs with respect to at least one communication mode;
    based on the information and the communication priority, selectively establishing an interference mitigation policy chosen to provide assured communications for the PCD with priority; and
    executing the interference mitigation policy in the first and second PCDs to cooperatively provide assured communication for the PCD with priority, where the interference mitigation policy comprises
        using the second network wireless communication link to communicate to the second PCD first data directed to the first PCD from the first wireless network, the first data including signaling data indicating that a message from the first wireless network will be sent to the first PCD,
        directly using the first data at the second PCD to select at least one action to be performed by the second PCD for mitigating interference to the first PCD, and
        performing the at least one action at the second PCD to mitigate interference to the first PCD.

2. The method according to claim 1, wherein the executing includes mitigating interference to the first PCD caused by a second network wireless communication link between a second wireless network base station and the second PCD.

3. The method according to claim 1, further comprising using the second network wireless communication link to communicate second data between the second PCD and the second wireless network base station concurrent with the first data, the second data exclusively pertaining to the second wireless network.

4. The method according to claim 1, further comprising subsequent to receiving the first data at the second PCD, further communicating the first data from the second PCD to the first PCD.

5. The method according to claim 4, further comprising communicating the first data to the first PCD by using the local communication link.

6. The method according to claim 1, further comprising selecting the first data to exclusively include the signaling data.

7. The method according to claim 1, further comprising communicating the first data from the first network to the first PCD using a first network wireless communication link between a first wireless network base station and the first PCD.

8. The method according to claim 7, further comprising communicating the first data to the first PCD using the first network wireless communication link concurrent with communicating the first data to the first PCD using the local communication link and the second network wireless communication link.

9. The method according to claim 7, further comprising selecting the first data to include signaling data for controlling a communication session involving the first PCD and the first wireless network.

10. The method according to claim 9, further comprising selecting the first data to include voice data.

11. The method according to claim 1, wherein the at least one action comprises selectively delaying transmission of second data from the second PCD to the second wireless network base station.

12. The method according to claim 1, wherein the at least one action comprises reducing a transmitted power level for data transmitted from the second PCD.

13. The method according to claim 1, wherein the at least one action comprises throttling a transmission data rate.

14. The method according to claim 1, wherein the at least one action comprises controlling at least one of a transmit duration and an interval between transmit times for transmission of data from the second PCD to the second wireless network base station.

15. The method according to claim 1, wherein the at least one action comprises changing a frequency used by the second PCD to communicate with the second wireless network.

* * * * *